United States

[11] 3,614,209

[72] Inventor William J. Seaman
Center Line, Mich.
[21] Appl. No. 13,408
[22] Filed Feb. 24, 1970
[45] Patented Oct. 19, 1971
[73] Assignee Chrysler Corporation
Highland Park, Mich.

[54] WIDE ANGLE-BIOCULAR EYEPIECE
7 Claims, 1 Drawing Fig.
[52] U.S. Cl........................................................ 350/215,
350/96, 350/175 E
[51] Int. Cl........................................................ G02b 5/16,
G02b 9/62, G02b 25/04

[50] Field of Search........................................... 350/215,
216, 220, 175 E, 96

[56] References Cited
UNITED STATES PATENTS
2,846,918 8/1958 Miles............................ 350/175 E UX
3,516,734 6/1970 Schmidt........................ 350/216
FOREIGN PATENTS
1,237,355 3/1967 Germany...................... 350/220
Primary Examiner—John K. Corbin
Attorney—Talburtt and Baldwin ABSTRACT: A wide-angle biocular eyepiece comprising six spaced optical elements.

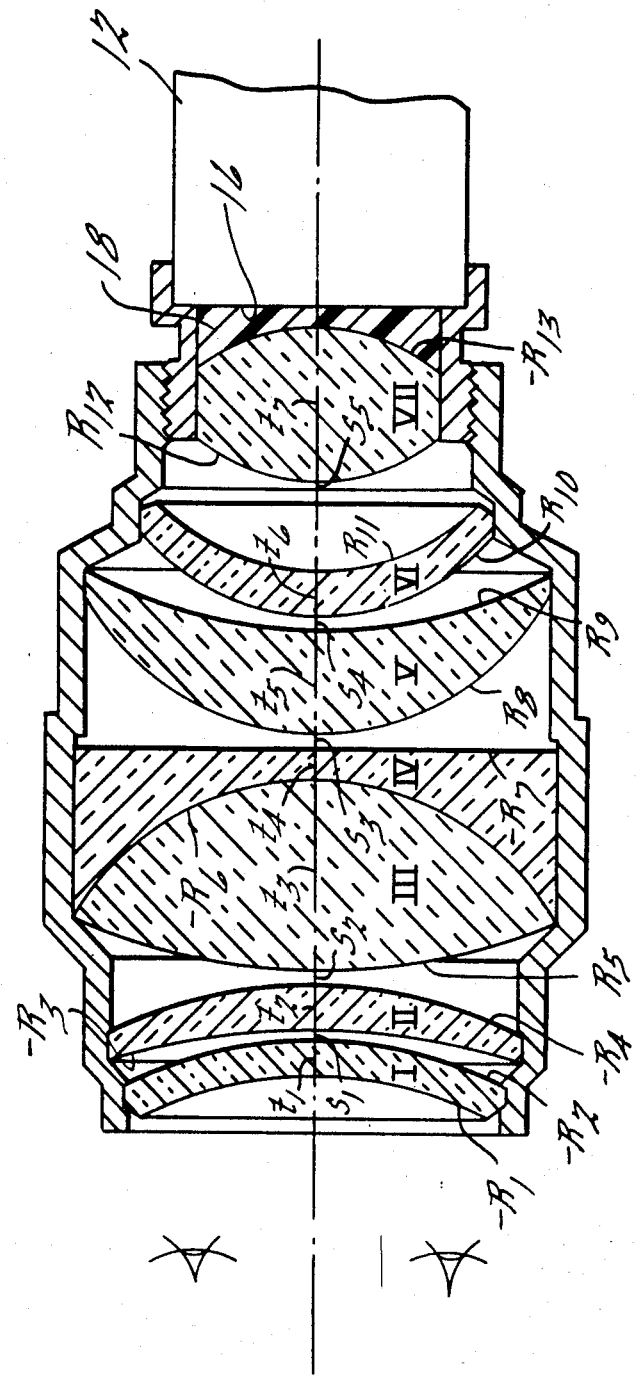

WIDE ANGLE-BIOCULAR EYEPIECE

BACKGROUND

Eyepieces used in visual optical instruments usually have an external accessible pupil location where the eye may be placed for the purpose of seeing a large apparent field. Only the rays passing through this well-defined exit pupil need be corrected. With such a small aperture, the system need only be corrected for astigmatism, field curvature, distortion and lateral color. Spherical aberration, coma and axial chromatic aberration are normally present but the instrument selects so small a portion of the possible rays passing through the eyepiece that these aberrations ordinarily are not significant and correction need not be made for them.

Night vision devices are one type of optical instrument on which eyepieces are used. In both active and passive night vision devices, an image is formed on a phosphor luminescent anode which is too small for convenient viewing by the unaided eye. Eyepieces are required to present an enlarged image to an observer.

Many types of eyepiece optical systems can be used to observe images formed in electro-optical devices where the photon image appears on a phosphor screen. Most common are the monocular eyepieces, which function as magnifiers and are usually built by enlarging the useful area of the optical elements. The resulting optical systems suffer from intolerable aberrations caused by the lens curvatures being penetrated by light rays at great distances from the optical axis. This ray distance is at least as large as one-half of the interpupillary distance of the observer. Considering the relatively short focal length required to produce sufficient magnification in such optical systems, the relative aperture at which the biocular magnifier must operate is often smaller than 1.0. Correction of optical aberrations for this large relative aperture is difficult at best, and becomes impossible if the number of lens elements available for aberration correction is limited by weight or size constraints. Many well-corrected biocular magnifiers have been described in the literature. Two typical examples are shown in U.S. Pats. 2,885,928 and 2,900,871. From the description of the optical system given in these patents it is apparent that biocular eyepieces require a considerable design effort to provide optical aberration correction across the necessarily large exit pupil diameter.

When an eyepiece is used with an image tube, the object plane radiates light in all directions and there is no well-defined pupil or stop. If a typical prior art eyepiece is used and is viewed with the eye displaced either longitudinally or laterally, the observer will see considerable amounts of distortion, astigmatism, and color aberration.

This will also be the case when both eyes are used in viewing. Each eye is displaced laterally from the optical axis and may be looking through different portions at either side of the eyepiece so that the aberrations will not only produce distortions but will blur the image and disturb steriopsis as well.

As a rule, eyepieces which are sufficiently corrected for a small, fixed pupil usually prove to be inadequate when used as magnifiers. What is required is a system that is uniformly good over a large pupil.

Night observation and other viewing through eyepieces can be accomplished much more easily if the observer is permitted to use both eyes for the viewing function without these aberrations. In addition, for prolonged viewing without eyestrain, it is desirable that the user observe the image with both eyes.

It is also desirable from a human factors' viewpoint to supply as large a field as possible with a large exit pupil and eye relief. Normally, however, large exit pupils and large fields of view introduce source geometric aberrations, among them, astigmatism, lateral color and distortion. Spherical aberration becomes a factor on axis if the exit pupil is chosen too large. All these aberrations tend to decrease the theoretical and practical contrast transfer of the eyepiece assembly and must be corrected.

SUMMARY OF THE INVENTION

The present invention relates in general to six element eyepieces of sufficient aperture to allow the magnified observation of intermediate images with both eyes of an observer simultaneously to obtain a sharp image across large fields of view. These biocular eyepieces allow for head and eye movement. They relate specifically to the observation of images formed on phosphor-coated screens of electronic imaging devices but may be used for other purposes where biocular viewing is desired. In addition to providing sharp imagery, the eyepieces described herein are useful for large fields of view.

More specifically, this invention provides eyepieces with an external, accessible pupil of such large diameter that the eyes of the observer may comfortably view the image even if not perfectly centered with the optical axis. In these eyepieces all of the emergent rays are adequately corrected so that it is unimportant between relatively wide limits where the observer's eyes are located either laterally or longitudinally.

It is then a primary object of this invention to provide wide-angle biocular eyepieces suitable for use with image intensifier tubes in night vision equipment to obviate the eyestrain which is often encountered with monocular active or passive night observation devices.

It is a general object to provide biocular eyepieces for viewing intermediate images through a single optical channel, that is, through one set of coaxial optical elements.

It is a specific object of this invention to provide biocular eyepieces suitable for magnified viewing of phosphor screens of electro-optical imaging devices wherein the screens have diameters from 25 millimeters to 80 millimeters and emit visible light of the spectral characteristics represented by the P–20 phosphor curve. The peak of the P–20 spectral distribution is near 5,500A, closely represented by the green e-line of Mercury.

It is a further object to provide eyepieces wherein the dispersive quality of the optical elements are selected so as to provide a particularly sharp achromatic image when used with light sources with a spectral distribution similar to that of a P–20 type phosphor.

It is a still further object of this invention to provide wide-field, biocular eyepieces with an apparent field of view of approximately 55° and a long eye relief of approximately 15 millimeters for use with image intensifier tubes of 25-mm. image diameters and a P–20 phosphor.

It is yet another specific object of this invention to provide a spherically and chromatically corrected biocular eyepiece with an 80-mm. exit pupil diameter and an eye relief of not less than 80 mm.

BRIEF DESCRIPTION OF THE DRAWING

The exact nature of this invention as well as other objects and advantages thereof will be apparent from consideration of the following specification and the single figure of the drawing which illustrates a diagrammatic embodiment of an eyepiece according to the invention in combination with an image tube.

DESCRIPTION OF THE PREFERRED EMBODIMENTS

Referring to the drawing, this invention consists of a series of lenses or refracting elements, collectively identified generally at 10, arranged to provide an eyepiece having such large final apertures that both eyes of an observer may comfortably view an intermediate image such as that provided by the phosphor screen of an image tube 12. The lenses are suitably mounted and maintained in a predetermined spaced relationship by a suitable housing schematically indicated at 14. Optical connection between the display screen 16 of the image tube and the eyepiece is established by a fiber optic faceplate 18. There is no need for an adjustment of interpupillary distance and only focusing need be provided for in the use of this eyepiece. Focusing may readily be obtained by providing for the variation of the airspace preceding the last element of the eyepiece.

The eyepiece consists of six airspaced elements corrected for spherical and chromatic aberrations, coma and astigmatism. The six elements are formed from seven lenses designated respectively I, II, III, IV, V, VI, and VII, progressing from the eye position at the front of the eyepiece to the image location at the rear, with the doublet element consisting of lenses III and IV. The centrally located doublet lenses III and IV, are surrounded by two meniscus lenses II and V respectively on each side. Lenses II and V are convex toward the doublet. In the foremost position to the front of the eyepiece is a meniscus lens I which is convex toward lens II. Spaced rearwardly of lens V is another meniscus lens VI which is convex toward lens V. A strong positive biconvex field lens VII is positioned between meniscus lens VI and the display surface 16 of image tube 12 on which the image to be viewed is displayed. The two eyes of an observer are located on both sides of the optical axis of the eyepiece as shown.

More specifically, the six airspaced elements are arranged in the following order front to rear: the negative meniscus lens I concave to the observer; the positive meniscus lens II concave to the observer; a cemented doublet consisting of a positive lens III and a negative lens IV, the doublet being externally biconvex; the positive meniscus lens V convex to the observer; the negative meniscus lens VI convex to the observer, and the positive biconvex lens VII which when used with an image tube is preferably cemented to the planoconcave fiber optic faceplate 18 thereof.

All six elements are airspaced from each other by successive airspaces which are designated respectively $S_1$, $S_2$, $S_3$, $S_4$ and $S_5$ and have axial thicknesses designated respectively $t_1$, $t_2$, $t_3$, $t_4$, $t_5$, $t_6$ and $t_7$.

It is characteristic of these eyepieces that lenses I and II possess net positive refractive power; that lens III of the doublet consists of positive crown glass and lens IV of the doublet consists of negative flint glass; that lenses V and VI possess net positive refractive power, and lens VII possesses net positive refractive power. All lenses should be substantially corrected for spherical and chromatic aberrations, coma and astigmatism.

The equivalent focal lengths of the successive lenses I to VII as constituted in the above description are given by the mathematical statements contained in table 1 herebelow, the focal lengths being designated $F_1$ to $F_7$ for lenses I to VII respectively,

TABLE 1

| | | |
|---|---|---|
| 15.65F | $<-F_1<$ | 19.135F |
| 6.401 | $<F_2<$ | 7.823 |
| 1.092 | $<F_3<$ | 1.334 |
| 1.510 | $<-F_4<$ | 1.846 |
| 2.678 | $<F_5<$ | 3.274 |
| 21.151 | $<-F_6<$ | 25.851 |
| 0.946 | $<F_7<$ | 1.156 |

The values for axial thicknesses of the successive lens I to VII, designated respectively $t_1$ to $t_7$, and the successive interlens airspaces, designated $S_1$ to $S_5$, are given by the mathematical expressions contained in table 2 herebelow:

TABLE 2

| | | |
|---|---|---|
| 0.1150F | $<t_1<$ | 0.1406F |
| 0.1726 | $<t_2<$ | 0.2110 |
| 0.8747 | $<t_3<$ | 1.0691 |
| 0.1036 | $<t_4<$ | 0.1266 |
| 0.3596 | $<t_5<$ | 0.4395 |
| 0.1438 | $<t_6<$ | 0.1758 |
| 0.4890 | $<t_7<$ | 0.5976 |
| 0.0115F | $<S_1<$ | 0.0141F |
| 0.0115 | $<S_2<$ | 0.0141 |
| 0.0115 | $<S_3<$ | 0.0141 |
| 0.0288 | $<S_4<$ | 0.0352 |
| 0.2954 | $<S_5<$ | 0.3610 |

The radii of the successive lens surfaces of lens I to VII which are designated successively $-R_1$, $-R_2$, $-R_3$, $-R_4$, $-R_5$, $-R_6$, $-R_7$, $-R_8$, $-R_9$, $-R_{10}$, $-R_{11}$, $-R_{12}$ and $-R_{13}$ have the following values as given in terms of the quantity F, i.e., the equivalent focal length of the eyepiece, in the mathematical statements in table 3 herebelow wherein the minus ($-$) sign signifies that the surface is concave toward the front or observer's side.

TABLE 3

| | | |
|---|---|---|
| 1.303F | $<-R_1<$ | 1.592F |
| 1.634 | $<-R_2<$ | 1.998 |
| 2.374 | $<-R_3<$ | 2.902 |
| 1.825 | $<-R_4<$ | 2.231 |
| 2.044 | $<R_5<$ | 2.498 |
| 1.041 | $<-R_6<$ | 1.272 |
| 25.457 | $<-R_7<$ | 31.114 |
| 0.898 | $<R_8<$ | 1.098 |
| 0.656 | $<R_9<$ | 2.024 |
| 0.830 | $<R_{10}<$ | 1.014 |
| 0.727 | $R_{11}<$ | 0.889 |
| 0.585 | $<R_{12}<$ | 0.714 |
| 0.644 | $<-R_{13}<$ | 0.788 |

One set of preferred specific values by way of specific example of the focal lengths $F_1$ to $F_7$, the values of the lens thicknesses $t_1$ to $t_7$, the values for the airspaces $S_1$ to $S_5$ and the values of the radii $-R_1$ to $-R_{13}$ are given in table 4 herebelow:

TABLE 4

| | | |
|---|---|---|
| $-F_1=17.395F$ | $t_1=0.1278F$ | $S_1=0.0128F$ |
| $F_2=7.112$ | $t_2=0.1918$ | $S_2=0.0128$ |
| $F_3=1.213$ | $t_3=0.7191$ | $S_3=0.0128$ |
| $-F_4=1.678$ | $t_4=0.1151$ | $S_4=0.0320$ |
| $F_5=2.976$ | $t_5=0.3995$ | $S_5=0.3282$ |
| $-F_6=23.501$ | $t_6=0.1598$ | |
| $F_7=1.051$ | $t_7=0.5433$ | |

$-R_1=1.447F$
$-R_2=1.816$
$-R_3=2.638$
$-R_4=2.028$
$R_5=2.271$
$-R_6=1.157$
$-R_7=28.285$
$R_8=0.998$
$R_9=1.840$
$R_{10}=0.922$
$R_{11}=0.808$
$R_{12}=0.649$
$-R_{13}=0.716$ $-R_{13} = 0.716$

In the specific preferred embodiment, the exit pupil of the eyepiece is 80 mm., about equal to the preferred focal length of 80 mm. The large exit pupil is desired for biocular viewing whereas the short focal length is desired to provide a large apparent field of view for presentation to an observer. It is characteristic of a biocular eyepiece that the exit pupil diameter be large relative to the focal length i.e., that the relative aperture be about F/1.0.

Although only certain embodiments of the present invention have been shown and described in detail, other forms are possible and changes may be made in the constructional details thereof within the specified limits without departing from the spirit of the invention as defined in the claims.

What is claimed is:

1. A large aperture eyepiece covering a large biocular apparent field of view, said eyepiece having an external pupil and comprising from the eye position to the image location: negative meniscus and a positive meniscus lens concave to the observer with net positive refractive power, a cemented doublet consisting of a positive crown glass lens and a negative flint glass lens, two positive meniscus lenses convex to the observer with net positive refractive power and a single biconvex field lens with net positive refractive power, all lenses having sufficient diameters to permit biocular viewing of the eyepiece with both eyes of an observer simultaneously.

2. An eyepiece according to claim 1 having a relative aperture of about F/1.0.

3. A biocular eyepiece having a relative aperture of about F/1.0 and an exit pupil which is large relative to the overall focal length of the eyepiece whereby simultaneous viewing of the eyepiece with both eyes of an observer is made possible, the eyepiece comprising six airspaced elements including:
   a negative meniscus lens I concave to the observer;
   a positive meniscus lens II concave to the observer;
   a cemented externally biconvex doublet consisting of a positive lens III and a negative lens IV;
   a positive meniscus lens V convex to the observer;
   a negative meniscus lens VI convex to the observer, and
   a positive biconvex lens VII;
   each of said lenses being substantially corrected for spherical and chromatic aberrations, coma, and astigmatism.

4. The eyepiece of claim 3 including means for establishing optical contact between said lens VII and an intermediate imaging means.

5. The eyepiece of claim 4 wherein said means comprises a planoconcave optic faceplate.

6. An eyepiece with substantially large apertures to permit biocular viewing of fields of view up to about 60° from an eye relief distance of up to about 80 mm. whereby simultaneous viewing of the eyepiece with both eyes of an observer is made possible, the eyepiece comprising six airspaced elements including:
   a negative meniscus lens concave to the observer designated I;
   a positive meniscus lens concave to the observer designated II;
   a cemented externally biconvex doublet consisting of a positive and a negative lens designated III and IV respectively;
   a positive meniscus lens convex to the observer designated V;
   a negative meniscus lens, convex to the observer designated VI; and
   a positive biconvex field lens designated VII;
   the values for the constructional data for said eyepiece being given substantially in the table of mathematical expressions herebelow wherein $F_1$ to $F_7$ respectively represents the equivalent focal length of lenses I to VII, $-R_1$ to $-R_{13}$ respectively represent the radii of the successive lens surfaces of lenses I to VII, the minus (−) sign used therewith denoting lens surfaces which are concave toward the observer's side of the eyepiece, $t_1$ to $t_7$ represent the axial thickness of lenses I to VII, and $S_1$ to $S_5$ represent the successive interlens airspaces between the lenses:

| | | |
|---|---|---|
| | | $-R_1=1.447F$ |
| | | $-R_2=1.816$ |
| | | $-R_3=2.638$ |
| $-F_1=17.395F$ | | $-R_4=2.028$ |
| $F_2=7.112$ | | $R_5=2.271$ |
| $F_3=1.213$ | | $-R_6=1.157$ |
| $-F_4=1.678$ | | $-R_7=28.285$ |
| $F_5=2.976$ | | $R_8=0.998$ |
| $-F_6=23.501$ | | $R_9=1.840$ |
| $F_7=1.051$ | | $R_{10}=0.922$ |
| | | $R_{11}=0.808$ |
| | | $R_{12}=0.649$ |
| | | $-R_{13}=0.716$ |
| $t_1=0.1278F$ | | |
| $t_2=0.1918$ | | $S_1=0.0128F$ |
| $t_3=0.7191$ | | $S_2=0.0128$ |
| $t_4=0.1151$ | | $S_3=0.0128$ |
| $t_5=0.3995$ | | $S_4=0.0320$ |
| $t_6=.1598$ | | $S_5=0.3282$ |
| $t_7=0.5433$ | | |

7. The eyepiece of claim 6 including a fiberoptics plate contacting lens VII, the contacting surface of said plate being suitably curved to match the surface of the lens.